United States Patent
Digeos et al.

(10) Patent No.: US 12,269,604 B2
(45) Date of Patent: Apr. 8, 2025

(54) DEFROSTING AND ACOUSTIC TREATMENT DEVICE FOR AN AIR INTAKE LIP OF A TURBOJET ENGINE NACELLE

(71) Applicant: Safran Nacelles, Gonfreville l'Orcher (FR)

(72) Inventors: Virginie Emmanuelle Anne Marie Digeos, Gonfreville l'Orcher (FR); Patrick Boileau, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 988 days.

(21) Appl. No.: 16/991,636

(22) Filed: Aug. 12, 2020

(65) Prior Publication Data

US 2020/0369401 A1   Nov. 26, 2020

Related U.S. Application Data

(63) Continuation of application No. PCT/FR2019/050286, filed on Feb. 8, 2019.

(51) Int. Cl.
| | | |
|---|---|---|
| *B64C 33/02* | (2006.01) | |
| *B64D 15/04* | (2006.01) | |
| *B64D 33/02* | (2006.01) | |
| B64D 29/06 | (2006.01) | |
| F02C 7/047 | (2006.01) | |

(52) U.S. Cl.
CPC .............. *B64D 33/02* (2013.01); *B64D 15/04* (2013.01); *B64D 29/06* (2013.01); *B64D 2033/0206* (2013.01); *B64D 2033/0233* (2013.01); *B64D 2033/0286* (2013.01); *F02C 7/047* (2013.01); *F05D 2220/323* (2013.01)

(58) Field of Classification Search
CPC .............................. B64D 33/02; B64D 15/04; B64D 2033/0206; B64D 2033/0233; B64D 2033/0286; F02C 7/047
See application file for complete search history.

(56) References Cited

U.S. PATENT DOCUMENTS

| | | | | |
|---|---|---|---|---|
| 2,887,173 | A * | 5/1959 | Boschi ................... | E04B 9/001 428/137 |
| 4,688,757 | A | 8/1987 | Cook et al. | |
| 6,592,078 | B2 * | 7/2003 | Porte ..................... | B64D 15/04 244/134 B |
| 6,698,691 | B2 * | 3/2004 | Porte ..................... | B64D 33/02 244/134 B |

(Continued)

FOREIGN PATENT DOCUMENTS

| | | |
|---|---|---|
| FR | 2925463 | 6/2009 |
| WO | 2009081020 | 7/2009 |
| WO | 2016005711 | 1/2016 |

OTHER PUBLICATIONS

International Search Report for International Application PCT/FR2019/050286, mailed Apr. 29, 2019.

*Primary Examiner* — Philip J Bonzell
(74) *Attorney, Agent, or Firm* — Burris Law, PLLC

(57) ABSTRACT

A defrosting and acoustic treatment device for an air intake lip of a turbojet engine nacelle includes an embossed acoustic structure that delimits a plurality of acoustic cells, each acoustic cell being delimited by an independent peripheral wall that allows a flow of de-icing air to flow around each acoustic cell.

11 Claims, 3 Drawing Sheets

(56) References Cited

U.S. PATENT DOCUMENTS

| | | | | |
|---|---|---|---|---|
| 8,413,922 | B2* | 4/2013 | Porte | F02C 7/045 |
| | | | | 244/1 N |
| 9,390,704 | B2* | 7/2016 | Hurlin | B64D 33/02 |
| 10,532,820 | B2* | 1/2020 | Caruel | B64D 33/02 |
| 11,059,559 | B2* | 7/2021 | Cedar | E04B 1/86 |
| 11,694,669 | B2* | 7/2023 | Benard | B64D 15/04 |
| 2002/0139899 | A1* | 10/2002 | Porte | B64D 15/04 |
| | | | | 244/134 B |
| 2002/0139900 | A1* | 10/2002 | Porte | F02C 7/047 |
| | | | | 244/134 C |
| 2005/0263346 | A1* | 12/2005 | Nishimura | G10K 11/16 |
| | | | | 181/290 |
| 2010/0276548 | A1* | 11/2010 | Porte | B64D 33/02 |
| | | | | 244/53 B |
| 2011/0139927 | A1 | 6/2011 | Porte et al. | |
| 2016/0257418 | A1* | 9/2016 | Caruel | B64D 15/04 |
| 2018/0304986 | A1* | 10/2018 | Porte | B64C 1/40 |
| 2018/0304987 | A1* | 10/2018 | Porte | B64C 1/40 |
| 2019/0270504 | A1* | 9/2019 | Cedar | B64C 1/066 |
| 2020/0276641 | A1* | 9/2020 | Benard | B33Y 80/00 |

* cited by examiner

DEFROSTING AND ACOUSTIC TREATMENT DEVICE FOR AN AIR INTAKE LIP OF A TURBOJET ENGINE NACELLE

CROSS-REFERENCE TO RELATED APPLICATIONS

This application is a continuation of International Application No. PCT/FR2019/050286, filed on Feb. 8, 2019, which claims priority to and the benefit of FR 18/51152 filed on Feb. 12, 2018. The disclosures of the above applications are incorporated herein by reference.

FIELD

The present disclosure relates to a defrosting and acoustic treatment device for an air intake lip of a turbojet engine nacelle and its manufacturing method.

BACKGROUND

The statements in this section merely provide background information related to the present disclosure and may not constitute prior art.

An aircraft is propelled by one or more propulsion units each comprising a turbojet engine/turboprop engine housed in a tubular nacelle. Each propulsion unit is attached to the aircraft by a mast generally located under a wing or at the level of the fuselage.

A nacelle generally has a structure comprising an air intake upstream of the engine, a middle section intended to surround a fan of the turbojet engine, a downstream section accommodating thrust reversing means and intended to surround the combustion chamber of the turbojet engine and is generally terminated by an ejection nozzle whose outlet is located downstream of the turbojet engine.

The air intake comprises, on the one hand, an air intake lip adapted to allow optimum capture toward the turbojet engine of the air necessary for the supply of the fan and of the inner compressors of the turbojet engine, and on the other hand, a downstream structure on which the air intake lip is attached and intended to channel the air toward the blades of the fan. The unit is attached upstream of a fan casing belonging to the upstream section of the nacelle.

In flight, depending on the temperature and humidity conditions, ice may be formed on the nacelle, in particular at the level of the outer surface of the air intake lip. The presence of ice or frost changes the aerodynamic properties of the air intake and disturbs the air flow to the fan. In addition, the formation of frost on the air intake of the nacelle and the ingestion of ice by the engine in the case of detachment of ice blocks can damage the engine and pose a risk to flight safety.

One solution for defrosting the outer surface of the air intake lip is to prevent ice from being formed on this outer surface by keeping the surface concerned at a sufficient temperature.

Thus, it is known, for example from U.S. Pat. No. 4,688,757, to take hot air from the compressor of the turbojet engine and bring it to the level of the air intake lip in order to heat the outer surface of the lip.

Also, it is known to equip the air intake lip of the nacelle with an acoustic panel adapted to absorb a portion of the noise emitted from inside the nacelle toward the outside of the nacelle.

Typically, the acoustic panel includes a perforated acoustic skin which is arranged facing the air intake flow path of the nacelle and a cellular core which is assembled on the acoustic skin.

The cellular core includes a plurality of acoustic cells, forming Helmholtz resonators, which are separated from each other by peripheral partition walls.

The acoustic cells extend in thickness from a front end bearing on the acoustic skin, to a rear end closed by a rear face.

The cellular core is generally made flat and has a high mechanical resistance to compression and flexion, which makes it difficult to shape the acoustic panel, in particular to shape the acoustic panel according to the geometry of an air intake lip of a nacelle.

International Application No. WO 2009/081020 describes and represents a structure for the acoustic treatment which makes an acoustic treatment and a frost treatment coexist.

According to this document, the structure comprises an acoustic skin, a cellular core including strips of cells, a reflective skin and a plurality of channels which are interposed between the cells and which are intended to channel hot air from a defrosting system.

It will be noted that the channels and the strips of cells form separate sub-assemblies which are manufactured independently and which are assembled together.

The manufacture of such a structure turns out to be long and expensive.

In addition, the strips of cells that form the cellular core do not seem to have a high mechanical resistance, the cellular core therefore plays little part in the mechanical resistance of the air intake lip.

Also, the design of the channels for the circulation of hot air seems to limit the circulation of hot air and the exchange surface between the hot air and the acoustic skin of the air intake lip.

SUMMARY

This section provides a general summary of the disclosure and is not a comprehensive disclosure of its full scope or all of its features.

The present disclosure relates to a defrosting and acoustic treatment device for an air intake lip of a turbojet engine nacelle, which includes an embossed acoustic structure adapted to bear on an acoustic skin of the air intake lip, and which delimits a plurality of acoustic cells, each acoustic cell being delimited by an independent peripheral wall which allows the circulation of a defrost air flow around each acoustic cell.

The term "embossed acoustic structure" means a structure having an alternation of acoustic cells in relief and hollows disposed in a network, in which the hollows located between the acoustic cells constitute intersecting lines such as a grid. The term "embossed acoustic structure" is also be defined as a "waffle acoustic structure."

The defrosting and acoustic treatment device according to the present disclosure allows the defrost air to circulate around each acoustic cell, the embossed acoustic structure which forms the acoustic cells transmitting the calories of the defrost air to the acoustic skin by conduction.

According to another characteristic, the embossed acoustic structure delimits at least two rows of acoustic cells which are connected together by at least one connecting portion adapted to bear on the acoustic skin of the air intake lip.

This characteristic increases the contact surface between the embossed acoustic structure and the acoustic skin to promote the conduction of calories from the defrost air to the acoustic skin.

According to another characteristic, the acoustic cells are made in one piece with the associated connecting portion.

According to another characteristic, each row of acoustic cells has an annular shape about a central axis.

According to another characteristic, the embossed acoustic structure has a monolithic annular shape or a shape of several monolithic angular sectors.

This characteristic favors the production of the embossed acoustic structure.

According to another characteristic, each acoustic cell has a generally pyramidal shape.

According to another characteristic, the defrosting and acoustic treatment device includes at least one deflector which is configured to guide a flow of defrost air toward the embossed acoustic structure.

This characteristic improves the heat exchange between the defrost air and the embossed acoustic structure.

According to another characteristic, the defrosting and acoustic treatment device includes a tube for distributing the defrost air which has a toroidal shape about the axis and which delimits a plurality of slots forming injectors, the slots being arranged opposite to the acoustic cells to direct the defrost air between the acoustic cells.

The present disclosure also concerns a method for manufacturing a defrosting and acoustic treatment device for an air intake lip of a turbojet engine nacelle, the defrosting and acoustic treatment device including an embossed acoustic structure which delimits a plurality of acoustic cells, each acoustic cell being delimited by an independent peripheral wall which allows the circulation of a defrost air flow around each acoustic cell, wherein at least one manufacturing step includes producing the embossed acoustic structure made in one piece into a monolithic part.

The present disclosure also concerns a turbojet engine nacelle of the type including a defrosting and acoustic treatment device of the type previously described.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
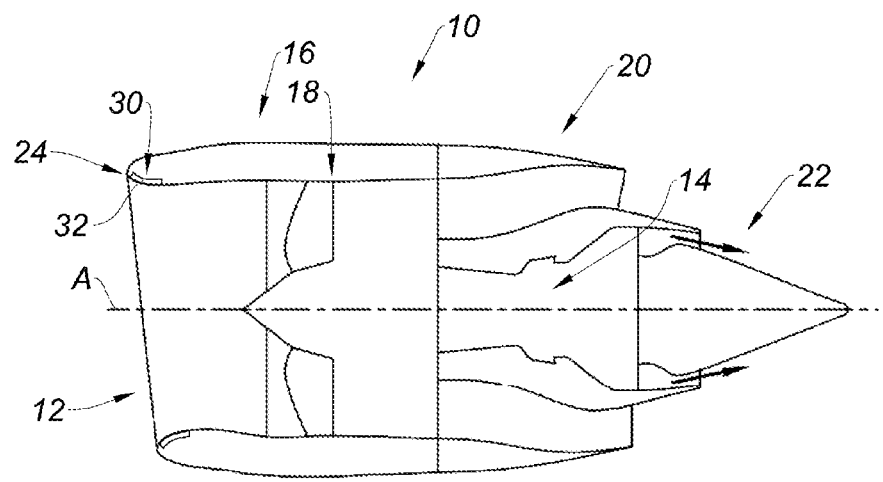
FIG. 1 is a schematic view in longitudinal section illustrating a turbojet engine nacelle comprising an air intake lip equipped with a defrosting and acoustic treatment device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, longitudinal, vertical, and transverse terminology will be used without limitation, with reference to the trihedron L, V, and T indicated in the figures, whose axis L is parallel to the central axis (A) of the nacelle.

It will be noted that the vertical axis (V) extends generally radially with respect to the central axis (A) of the nacelle and the transverse axis (T) extends generally tangentially with respect to the longitudinal central axis (A) of the nacelle.

It will be noted also that in the present disclosure, the terms "upstream" and "downstream" must be understood with respect to the circulation of the air flow inside the propulsion unit formed by the nacelle and the turbojet engine, e.g. from left to right in FIG. 1.

In all of the figures, identical or analogous reference numerals represent identical or analogous organs or sets of organs.

FIG. 1 represents a nacelle 10 of a generally annular shape which extends about a longitudinal central axis (A).

The nacelle 10 comprises an air intake 12 upstream of the engine 14, a middle section 16 intended to surround a fan 18 of the turbojet engine, a downstream section 20 accommodating thrust reversing devices and intended to surround the combustion chamber of the turbojet engine, and an ejection nozzle 22 whose outlet is located downstream of the turbojet engine.

Figure 2:
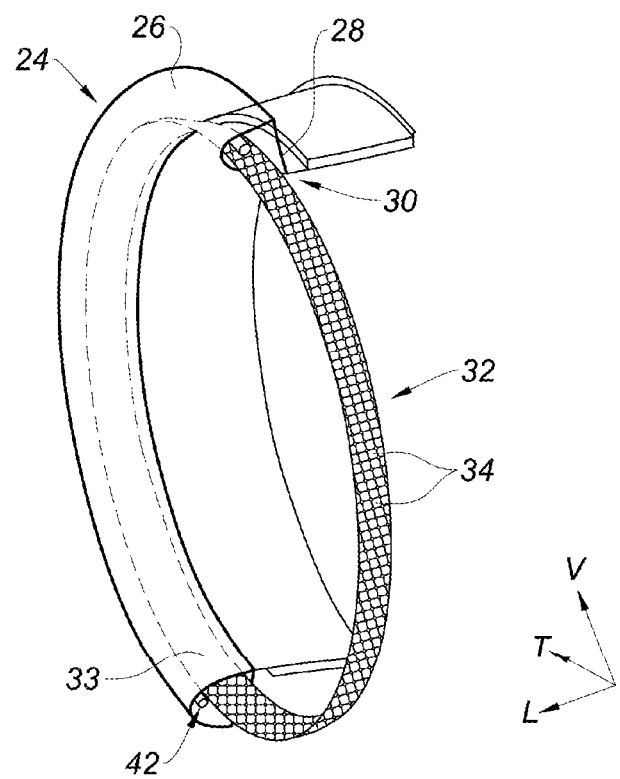
FIG. 2 is a partial perspective view illustrating the embossed acoustic structure of the defrosting and acoustic treatment device according to the present disclosure.

As can be seen in FIG. 2, the air intake 12 comprises an air intake lip 24 which forms a volume of an annular shape about the longitudinal central axis (A) of the nacelle 10 of a "D" shaped section.

The air intake lip 24 is delimited by an upstream outer wall 26 to be defrosted, forming the leading edge, and a downstream partition wall 28 which separates the volume delimited by the air intake lip 24 and the section of the nacelle which is connected to the air intake lip 24.

The air intake lip 24 is equipped with a defrosting and acoustic treatment device 30 which includes an embossed acoustic structure 32 which is bearing on an acoustic skin 33 perforated with the air intake lip 24.

The embossed acoustic structure 32 has an annular shape about the longitudinal central axis (A) of the nacelle.

Also, the embossed acoustic structure 32 delimits a plurality of acoustic cells 34 arranged in three rows 36 which each extend in a circle about the longitudinal central axis (A).

Each acoustic cell 34 is delimited by an independent peripheral wall 38 which allows the circulation of a defrost air flow around each acoustic cell 34.

The term "independent peripheral wall" means that the adjacent acoustic cells 34 do not have a common wall, so that the defrost air can circulate all around each acoustic cell 34.

Figure 3:
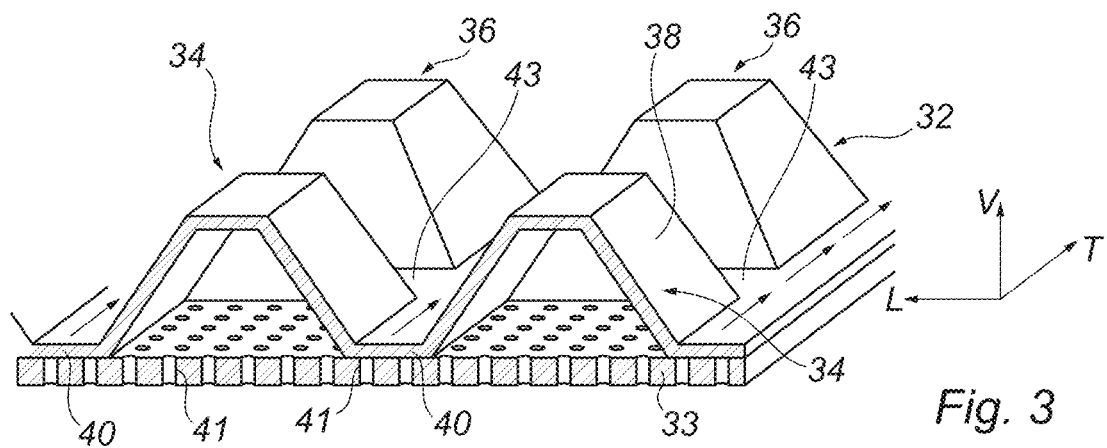
FIG. 3 is a detailed perspective view in longitudinal section illustrating the embossed acoustic structure of the defrosting and acoustic treatment device according to the present disclosure on the acoustic skin.

As can be seen in FIG. 3, each acoustic cell 34 has a dome shape.

More particularly, according to the example represented in FIG. 3, each acoustic cell 34 has a pyramidal shape, the peripheral wall 38 of each acoustic cell 34 forming four faces which are each in contact with the defrost air which circulates in the air intake lip 24.

Nonetheless, without limitation, each acoustic cell 34 may have a parallelepiped shape, such as for example a square shape.

Referring to FIG. 3, the three rows 36 are connected together in pairs by two connecting portions 40 which are bearing on the acoustic skin 33 of the air intake lip 24.

Each connecting portion 40 is a strip which extends longitudinally in width and which matches the shape of the air intake lip 24.

The acoustic cells 34 adjacent to each connecting portion 40 form a valley in which the defrost air flows to transmit calories to the acoustic skin 33 by conduction, via the embossed acoustic structure 32 and particularly through connecting portions 40.

In addition, the dome shape of each acoustic cell 34 is also adapted so that the defrost air circulates longitudinally between the acoustic cells 34, including perpendicular to the connecting portions 40.

Without limitation, the embossed acoustic structure 32 may also include connecting strips 43 which extend longitudinally in length to connect the acoustic cells 34 together. This characteristic is particularly suitable for the acoustic cells 34 of parallelepiped shape to allow the acoustic cells 34 to be spread apart and allow the defrost air to circulate longitudinally between the acoustic cells 34.

Still according to FIG. 3, it will be noted that the acoustic cells 34 are made in one piece with the associated connecting portion 40.

In other words, each acoustic cell 34 and each connecting portion 40 are formed by the embossed acoustic structure 32 in a monolithic part. In one form of the present disclosure, the embossed acoustic structure 32 is produced by cold forming by stamping a metal sheet.

Nonetheless, without limitation, the embossed acoustic structure 32 can also be produced by explosion forming, by incremental forming, by magnetoforming, or by hot forming.

Also, the embossed acoustic structure 32 is in some forms made in several angular sectors.

In addition, the embossed acoustic structure 32 is attached and fixed to the perforated acoustic skin 33, for example by brazing. The sheet which is used to manufacture the embossed acoustic structure 32 can be co-laminated with a brazing alloy to eliminate the process of depositing the brazing on the embossed acoustic structure 32.

Without limitation, the embossed acoustic structure 32 can also be fixed by welding.

The holes 41 formed in the acoustic skin 33 which are arranged in line with the connecting portions 40 are blocked by the acoustic connecting portions 40 and the holes 41 which are arranged in line with the acoustic cells 34 are open and open into the acoustic cells 34.

Figure 7:
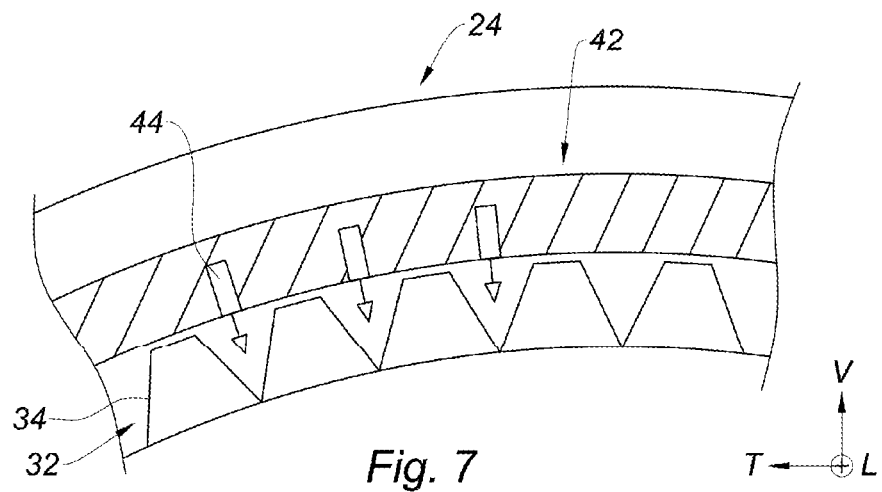
FIG. 7 is a schematic cross-sectional view illustrating a tube for guiding the defrost air in the lip, according to a third variant of the present disclosure.
Figure 8:
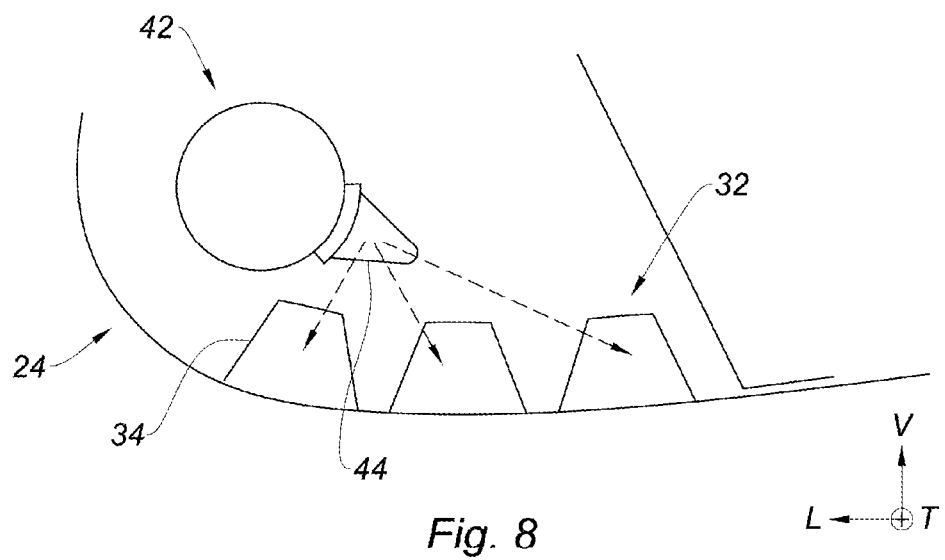
FIG. 8 is a schematic view in longitudinal section illustrating the deflector of FIG. 7, according to the third variant of the present disclosure.

According to another aspect of the present disclosure, the defrosting and acoustic treatment device 30 includes a tube 42 for distributing the defrost air illustrated in FIGS. 2, 7, and 8, which has a toroidal shape about the longitudinal central axis (A) and which is arranged in the air intake lip 24.

The tube 42 includes an intake (not represented) which is connected to a defrost hot air source and an outlet (not represented).

In addition, the tube 42 delimits a plurality of slots 44 forming injectors, which are arranged facing the acoustic cells 34 and which direct the defrost air between the acoustic cells 34, so that the defrost air passes around each acoustic cell 34 as can be seen in FIGS. 7 and 8.

Figure 4:
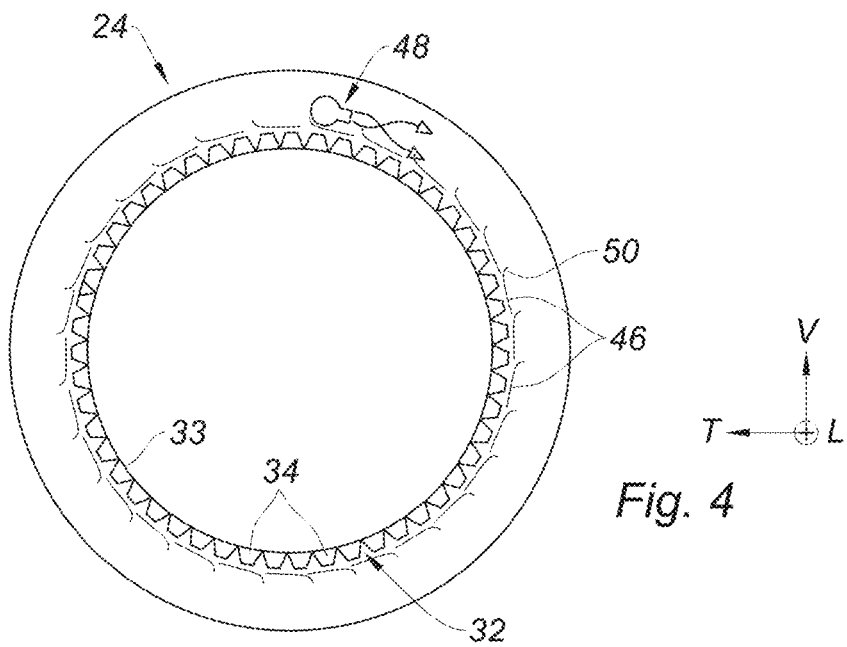
FIG. 4 is a schematic cross-sectional view illustrating the deflectors for guiding the defrost air in the lip, according to a first variant of the present disclosure.

According to a first variant illustrated in FIG. 4, the defrosting and acoustic treatment device 30 includes a plurality of deflectors 46 which replace the tube 42 for distributing defrost air and which are arranged angularly in a regular manner about the longitudinal central axis (A).

According to this first variant, the defrost air is injected into the air intake lip 24 by a nozzle 48 which gives a circular movement to the defrost air, about the longitudinal central axis (A).

In addition, each deflector 46 caps the embossed acoustic structure 32 and extends generally tangentially relative to the longitudinal central axis (A), and each deflector 46 has a leading edge 50 which is substantially raised to direct a portion of the defrost air flow toward the acoustic cells 34 to promote heat exchanges.

Figure 5:
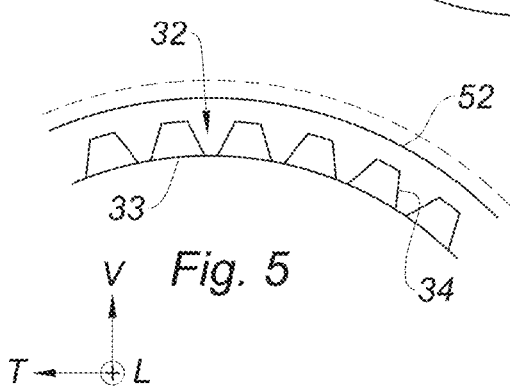
FIG. 5 is a schematic cross-sectional view illustrating a deflector for guiding the defrost air in the lip, according to a second variant of the present disclosure.
Figure 6:
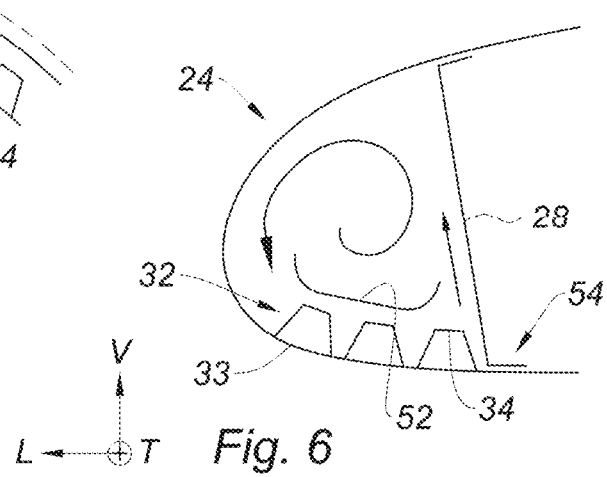
FIG. 6 is a schematic view in longitudinal section illustrating the deflector of FIG. 5, according to the second variant of the present disclosure.

According to a second variant illustrated in FIGS. 5 and 6, the defrosting and acoustic treatment device 30 includes an annular deflector 52 which extends about the longitudinal central axis (A) and which caps the embossed acoustic structure 32.

With reference to FIG. 6, the defrost air is injected into the air intake lip through an intake 54 which is formed in the downstream partition wall 28, so that the defrost air swirls in the air intake lip 24 as illustrated by the arrow on FIG. 6.

The deflector 52 is curved at its two ends so that the swirling defrost air flow passes between the deflector 52 and the acoustic cells 34, to promote heat exchanges.

The present disclosure also concerns a method for manufacturing a defrosting and acoustic treatment device 30 of the type described above, which comprises a manufacturing process making the rows 36 of acoustic cells 34 and the associated connecting portions 40 in one piece.

The present description of the present disclosure is given by way of non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for a turbojet engine, the nacelle comprising:
an air intake lip including an acoustic skin;
a defrosting and acoustic treatment device for the air intake lip, the defrosting and acoustic treatment device comprising a waffle acoustic structure adapted to bear on the acoustic skin of the air intake lip, and delimiting a plurality of acoustic cells, each acoustic cell being delimited by an independent peripheral wall that defines a top surface opposing the acoustic skin, each acoustic cell being tapered from the acoustic skin to the top surface such that the top surface of each acoustic cell is spaced apart and disconnected from the top surfaces of adjacent ones of the acoustic cells to define a space therebetween, a defrost air being allowed to be directed into the space from above the top surface to flow around each acoustic cell,
wherein the waffle acoustic structure delimits at least two rows of acoustic cells connected together by at least one connecting portion adapted to bear on the acoustic skin of the air intake lip, the acoustic cells being made in one piece with the at least one connecting portion, each connecting portion being a strip that has a main surface parallel to the acoustic skin and matching a shape of the air intake lip, and
wherein the acoustic skin includes perforations, the perforations being covered by each of the acoustic cells and the at least one connecting portion.

2. The nacelle according to claim 1, wherein each row of the acoustic cells has an annular shape about a longitudinal central axis (A).

3. The nacelle according to claim 1, wherein the waffle acoustic structure has a monolithic annular shape.

4. The nacelle according to claim 1, wherein the waffle acoustic structure has a shape of several monolithic angular sectors.

5. The nacelle according to claim 1, wherein each acoustic cell has a pyramidal shape.

6. The nacelle according to claim 1, wherein the defrosting and acoustic treatment device further comprises at least one deflector configured to guide the defrost air to flow toward the waffle acoustic structure.

7. The nacelle according to claim 1, wherein the defrosting and acoustic treatment device further comprises a tube for distributing the defrost air, the tube having a toroidal shape about a longitudinal central axis (A) and delimiting a plurality of slots forming injectors, the plurality of slots being arranged opposite the plurality of acoustic cells to direct the defrost air between the acoustic cells.

8. The nacelle according to claim 1, wherein adjacent two of the acoustic cells and a portion of the strip disposed therebetween define a valley.

9. The nacelle according to claim 1, wherein the defrosting and acoustic treatment device further comprises at least one connecting strip extending in a longitudinal direction of the nacelle to connect the acoustic cells in different rows, the connecting strip being perpendicular to the connecting portion.

10. The nacelle according to claim 1, wherein the waffle acoustic structure is configured to allow the top surface and a tapered surface of each of the acoustic cells and the at least one connecting portion to be exposed to the defrost air such that the defrost air is directed from above the top surface to flow around each of the acoustic cells and to allow heat from the defrost air to be transmitted through the top surface and the tapered surface of each of the acoustic cells and through the at least one connecting portion to the acoustic skin by conduction.

11. A method for manufacturing a defrosting and acoustic treatment device for an air intake lip of a turbojet engine nacelle, wherein the defrosting and acoustic treatment device comprises a waffle acoustic structure delimiting a plurality of acoustic cells, each acoustic cell being delimited by an independent peripheral wall that defines a top surface opposing an acoustic skin, each acoustic cell being tapered from the acoustic skin to the top surface such that the top surface of each acoustic cell is spaced apart and disconnected from the top surfaces of adjacent ones of the acoustic cells to define a space therebetween, a defrost air being allowed to be directed into the space from above the top surface to flow around each acoustic cell, the waffle acoustic structure delimiting at least two rows of acoustic cells connected together by at least one connecting portion adapted to bear on the acoustic skin of the air intake lip, the acoustic cells being made in one piece with the at least one connecting portion, each connecting portion being a strip that has a main surface parallel to the acoustic skin and matching a shape of the air intake lip, the acoustic skin including perforations, the perforations being covered by each of the acoustic cells and the at least one connecting portion,
wherein the method comprises at least one manufacturing process producing the waffle acoustic structure made in one piece into a monolithic part.

* * * * *